United States Patent [19]

Dworski

[11] Patent Number: 4,667,437

[45] Date of Patent: May 26, 1987

[54] FISH HOOK ASSEMBLY

[76] Inventor: Michael Dworski, 1919 19th Way, West Palm Beach, Fla. 33407

[21] Appl. No.: 756,372

[22] Filed: Jul. 18, 1985

[51] Int. Cl.⁴ .................... A01K 85/00; A01K 91/04
[52] U.S. Cl. ................................ 43/42.36; 43/44.83; 43/44.86
[58] Field of Search .............. 43/42.36, 43.16, 42.7, 43/34, 5, 44.8, 44.83, 44.86

[56] References Cited

U.S. PATENT DOCUMENTS

| | | | |
|---|---|---|---|
| 117,719 | 8/1871 | Arnold | 43/44.86 |
| 148,926 | 3/1874 | Cahoon | 43/44.86 |
| 1,055,104 | 3/1913 | Van Norsdall | 43/44.83 |
| 1,156,152 | 10/1915 | Krenrick | 43/44.83 |
| 2,792,664 | 5/1957 | Schwarzer | 43/44.83 |
| 3,398,477 | 8/1968 | Paluzzi | 43/44.8 |
| 3,826,034 | 7/1974 | Herek | 43/44.83 |

FOREIGN PATENT DOCUMENTS

| | | | |
|---|---|---|---|
| 666332 | 9/1929 | France | 43/42.36 |

Primary Examiner—Nicholas P. Godici
Assistant Examiner—K. Rowan
Attorney, Agent, or Firm—Charles S. McGuire

[57] ABSTRACT

A two-piece fish hook assembly for combination with a rigid lure having a passageway, open at both ends, extending therethrough. A first section of the assembly has a hook at one end and extends through a shank portion to the opposite, terminal end. The other section has an eye at one end for attachment of a line or leader, and extends through a shank portion to the opposite, terminal ends. The hook assembly is assembled with the lure in a permanent manner by inserting the shank portions of the eye and hook sections into the forward and rear ends, respectively, of the passageway. The two shank portions have engagement means in the form of angled teeth on their surfaces which may be slid over one another to bring the shank portions into overlapping relation within the passageway, but which lock the two sections of the assembly together and prevent disengagement thereof from the lure after insertion.

2 Claims, 4 Drawing Figures

FISH HOOK ASSEMBLY

BACKGROUND OF THE INVENTION

The present invention relates to fishing hooks assembled with artificial lures and, more specifically, to a hook assembly provided in two sections for combination with a rigid lure having a passageway therethrough.

In U.S. Pat. No. 3,899,847, issued Aug. 19, 1975, of the present inventor, a fishing lure in the nature of an artificial minnow is disclosed in a number of embodiments, each having a body portion with a longitudinally extending passageway, open at both ends, for passage of a line or leader to which a hook is attached. It is sometimes desireable to have the metal shank extend integrally from the hook end, through the lure to an eye at the opposite end for attachment of the line or leader. However, it is difficult and expensive to mold the plastic lure directly about the shank of the hook and a one-piece hook member, having a hook on one end and an eye on the other, cannot be passed directly through the constricted passageway in the lure.

Accordingly, it is a principal object of the present invention to provide a hook assembly which can quickly, easily and cheaply be assembled with a rigid fishing lure having a shank extending continuously through a passageway in the lure, with a hook and an eye at opposite ends.

It is a further object to provide a fishing hook assembly including two sections which may be inserted into opposite ends of a passageway in a rigid lure and automatically engage one another to prevent withdrawal upon insertion.

Still another object is to provide a two-piece fish hook assembly wherein shank portions of the two pieces are mutually engaged upon insertion into a constricted passageway in a rigid lure in at least two rotational orientations of the shank portions.

Other objects will in part be obvious and will in part appear hereinafter.

SUMMARY OF THE INVENTION

In accordance with the foregoing objects, the invention contemplates a fishing hook assembly initially provided in two sections, one having a hook and the other an eye at one end, and each extending through a shank portion to an opposite, terminal end. The shank portions of the two sections include integrally formed, unidirectional engagement means, allowing them to be moved in sliding, overlapped relation in a direction moving the hook and eye ends toward one another but preventing movement in the opposite direction when restrained against lateral movement.

The hook assembly is intended for combination with a rigid lure, such as a molded plastic artificial minnow, having an open passageway extending therethrough. The passageway is sized to be approximately equal in cross section to the overlapped shank portions of the two sections of the hook assembly. The assembly is permanently combined with the lure by inserting the terminal ends of the two sections into opposite ends of the passageway and advancing the shank portions into overlapping relation. Angled teeth on each of the shank portions slide over one another as the sections are moved into the passageway and are mutually engaged to prevent movement in the opposite direction, thereby preventing movement of the shank portions out of the passageway. The teeth may be provided on two sides, or completely around the two hook assembly sections, whereby the rotational orientation of the two sections as they are advanced into the passageway is not critical in order to insure engagement of the teeth.

DETAILED DESCRIPTION

Figure 1:
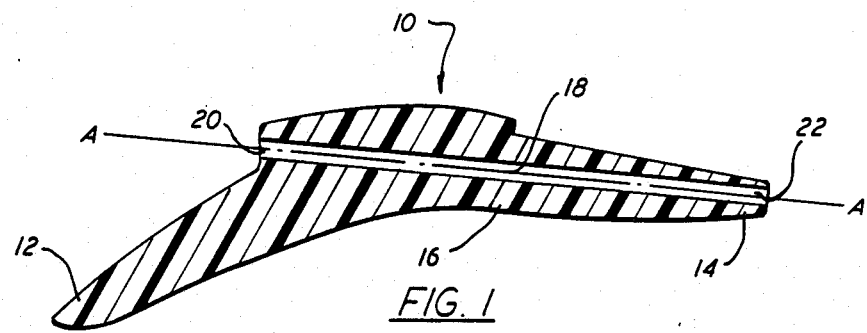
FIG. 1 is an elevational view of a fishing lure of the type with which the hook assembly of the invention is intended for combination, in vertical section.

Referring now to the drawing, in FIG. 1 is shown a fishing lure denoted generally by reference numeral 10, having head 12 and tail 14 ends and an intermediate body portion 16. Open passageway 18 extends along axis A—A through lure 10 between forward and rear ends 20 and 22, respectively. Lure 10 is generally of the type of one of the embodiments of aforementioned Pat. No. 3,899,847, formed as a single piece plastic molding, but may, of course, take other forms within the scope of the invention.

Figure 2:
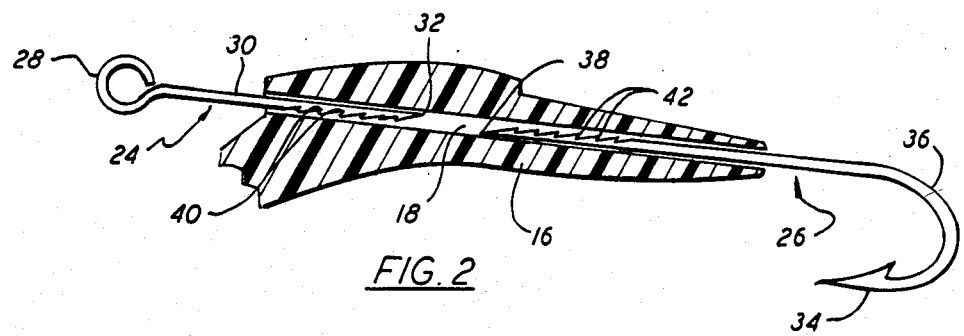
FIG. 2 is a side elevational view of a first embodiment of the two sections of the hook assembly with the terminal ends of the shank portions in spaced relation, also showing a fragment of the lure of FIG. 1.

The hook assembly is shown in FIG. 2, comprising two sections 24 and 26. Section 24 has eye 28 formed at one end and extends through shank portion 30 to terminal end 32. Section 26 has hook 34 at one end and extends through shank portion 36 to terminal end 38. Angled teeth 40 and 42 are formed in shank portions 30 and 36, respectively, extending in directions toward the eye and hook ends of the respective sections of the assembly. The cross sectional dimensions of passageway 18 conform generally to those of shank portions 30 and 36 when the latter are placed in superposed, overlapping relation.

Sections 24 and 26 of the hook assembly are combined with lure 10 by advancing terminal end 32 of section 24 into forward end 20, and terminal end 38 of section 26 into rear end 22, of passageway 18, as indicated in FIG. 2. When terminal ends 32 and 38 meet within passageway 18, shank portions move into overlapped relation and are urged into closely superposed relation by the dimensional constraints of passageway 18. The direction of angle of teeth 40 and 42 permits relative movement of the hook assembly sections in a direction wherein eye 28 and hook 34 are moved toward one another, but prevents movement in the opposite direction due to mutual engagement of the teeth after the sections have been fully inserted to the position shown in FIG. 3.

Figure 3:
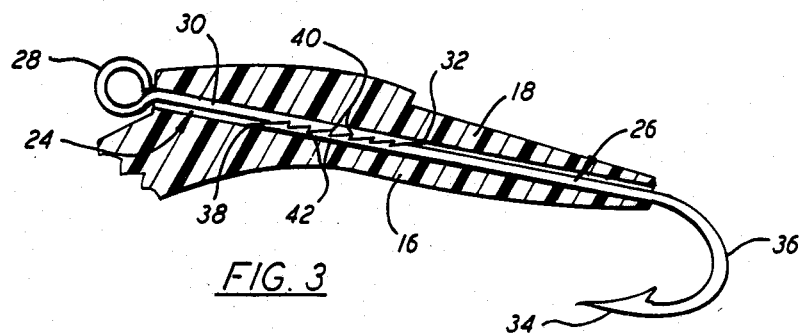
FIG. 3 is a side elevational view of the hook sections of FIG. 2 with the shank portions in overlapped relation, with the fragment of the lure.
Figure 4:
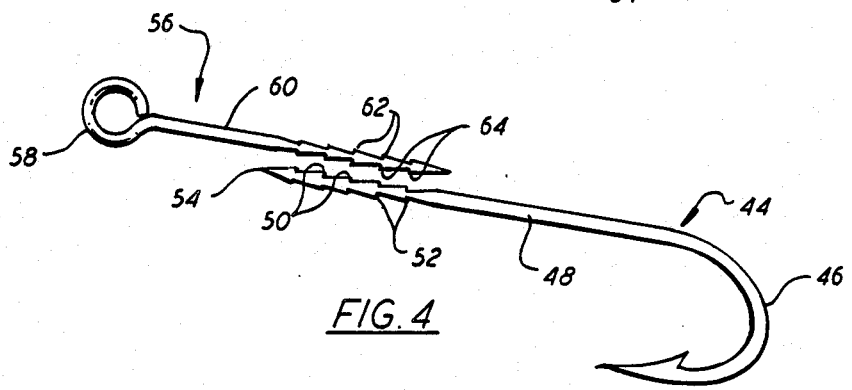
FIG. 4 is a perspective view of the hook sections in a second embodiment.

The embodiment shown in FIG. 4 differs from that of FIGS. 2 and 3 in that angled teeth are provided on both sides of each shank section rather than only one. Section 44 extends from hook 46, through shank portion 48, having angled teeth 50 and 52 on opposite sides thereof, to terminal end 54. Section 56 extends from eye 58 through shank portion 60, having angled teeth 62 and 64 on opposite sides thereof, to terminal end 66. Thus, shank portions 48 and 60 may be advanced into the lure passageway in either rotational orientation and will be mutually engaged by the angled teeth on the opposing sides.

While axis A—A of the lure passageway and, consequently, the shank portions of the hook assembly sections are essentially linear in the illustrated embodiment, curved shapes may also be employed. The hook assembly sections, and particularly the shank portions thereof, in the form shown are of square stock they may, of course, be made of round or other cross sectional configuration. The hook may, if desired, be a triple hook or other conventional configuration. After permanent combination of the hook assembly with the lure in the manner described, a line or leader of fishing tackle may be attached to the eye of the assembly for use of the lure in the usual manner.

It is further noted that, while hooks 34 and 46 of the two illustrated embodiments are shown as formed integrally with the respective shank portions 36 and 48, the hook could as well be formed separately and attached to the shank portion other than by being integrally formed therewith. For example, the end of shank portion 36 (or 48) which extends outside (rearwardly of) the lure after assembly therewith could be formed with an eye, as in the case of the other section of the assembly, and a separate hook of any desired configuration attached thereto in conventional manner. Thus, when one section of the assembly is described or claimed as having a hook at one end, this is intended to cover either an integrally formed or a separately attached hook.

What is claimed is:

1. A fishing lure with a permanently combined hook and eye assembly comprising:
   (a) a lure having a rigid body portion with an open-ended, elongated passageway of essentially uniform, predetermined cross section extending therethrough along a linear axis;
   (b) a first, rigid, metal section extending from a curved hook portion through a first, linear shank portion to a pointed terminal end;
   (c) a second, rigid, metal section extending from an eye portion through a second, linear shank portion to a pointed terminal end;
   (d) a first plurality of spaced, angled teeth formed in at least one surface of said first shank portion for a predetermined distance from said terminal end thereof, said teeth being inclined in the direction of said hook;
   (e) a second plurality of spaced, angled teeth formed in at least one surface of said second shank portion for said predetermined distance from said terminal end thereof, said teeth being inclined in the direction of said eye;
   (f) said first and second shank portions being arranged in superposed relation within said passageway for substantially said predetermined distance from said terminal end of each portion, said hook and eye portions being positioned outwardly adjacent opposite ends of said passageway, with said one surface of said first and second shank portions facing one another and said first and second plurality of teeth being in mutual engagement to prevent movement of said first and second sections in opposite directions, whereby said first and second sections are permanently assembled with said body poriton but physically unattached thereto; and
   (g) said superposed portions of said first and second shank portions having a combined cross sectional configuration essentially equal to that of said predetermined cross section of said passageway.

2. The invention according to claim 1 wherein said plurality of teeth are provided on at least two, opposite surfaces of each of said first and second shank portions.

* * * * *